United States Patent Office 2,758,412
Patented Aug. 14, 1956

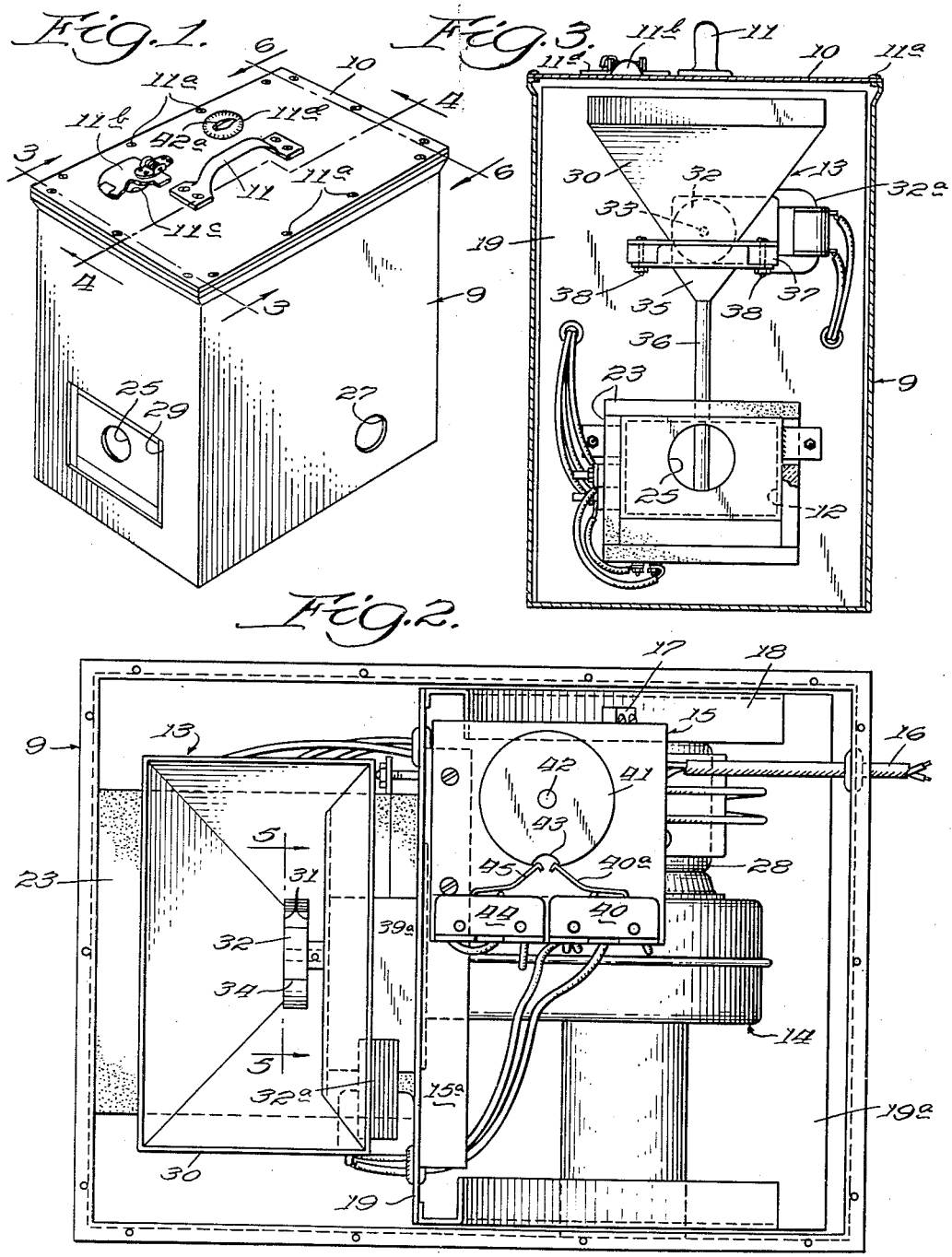

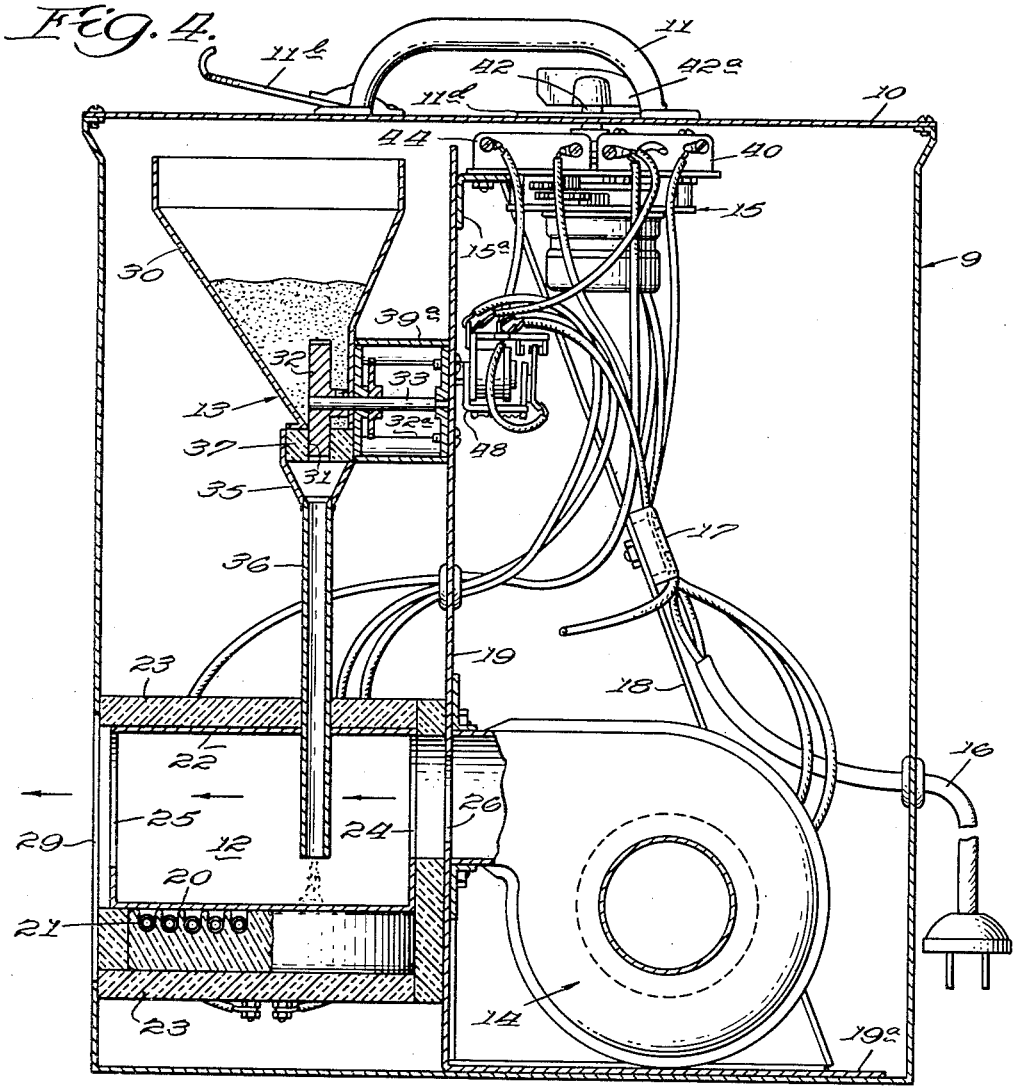
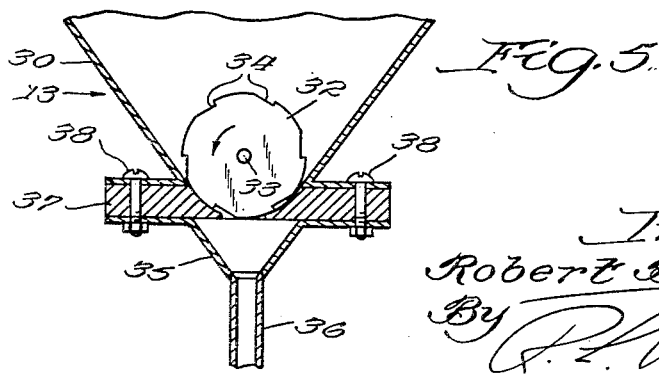

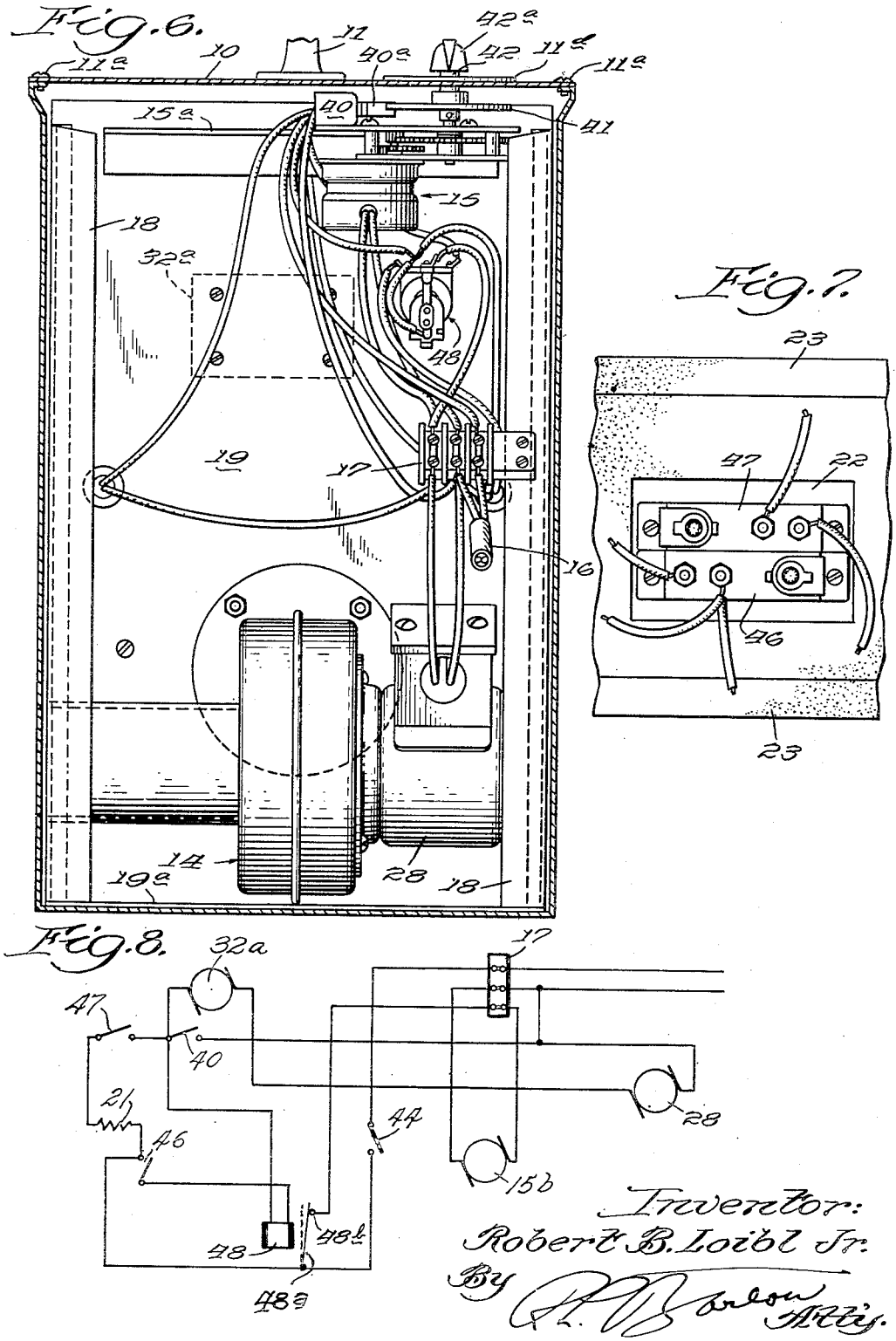

2,758,412

METHOD AND APPARATUS FOR PRODUCING AND UTILIZING INSECTICIDAL VAPOR

Robert B. Loibl, Jr., Los Angeles, Calif.

Application January 8, 1952, Serial No. 265,503

13 Claims. (Cl. 43—125)

My invention relates to a method of, and apparatus for, producing vapor having insecticidal properties and projecting a dense concentration of the vapor into any enclosed space to be treated to exterminate, in a very short time, many types of undesirable insects present therein.

The method and apparatus of my invention are particularly designed for use with the chemical lindane, a commercial product, which is the gamma isomer of hexachlorocyclohexane. It is to be understood that this method and apparatus are not necessarily restricted to the use of the chemical mentioned but, without change or with immaterial modification, may utilize other insecticidal materials having properties similar to lindane, which in the form utilized is a granular free flowing material resembling granulated sugar.

As generally practiced, fumigation of dwellings to eradicate insect pests involves the spraying of walls, floors, furniture and the like of the rooms with an insecticidal spray, or treatment of the sealed rooms with fumes poisonous to insects as well as to human beings. Such treatment is a lengthy process and it is an object of my novel method of and apparatus for exterminating insects from rooms, and other enclosed spaces, to enable such operations to be carried out speedily, safely, and without danger of damage to finished surfaces, hangings or furniture coverings.

A further object is to provide a small and readily carried apparatus which is self contained and very simply operated, requiring only to be furnished with a supply of lindane, or chemical having similar characteristics, set for a period of operation determined by the circumstances, and plugged into an electric outlet of the usual house circuit.

It is a further object of my invention to provide a fumigating or exterminating apparatus or device which operates automatically after being plugged into an electric outlet and switched on, requiring no attention during operation.

Another object of the invention is to provide a thermal chamber in the device of my invention having a hot plate therein onto which the lindane is dropped in a continuous series of small charges, by electrically operated feeding means, the hot plate being automatically maintained at a temperature such that the lindane is instantly vaporized without melting.

A further object is to provide means projecting the vapor from the device by means producing a current of air through the thermal chamber, control means being provided to insure that the current of air is not brought into operation until the hot plate has reached the required temperature.

A still further object of the invention is to arrange the apparatus of my invention upon a single supporting structure enclosed in a case, a single control means for the device being mounted on the exterior of the case. In the event that repair or adjustment of any of the mechanisms of the apparatus is needed the supporting structure may be readily removed from the case enabling access to be had to all of said mechanisms.

Another object of my invention is to produce a device of the kind described in which the current of air is maintained for a brief period after termination of the fumigating operation to clear the device of any fumes.

Still further objects and features of my invention will hereinafter appear from the following specification read with reference to the accompanying drawings illustrating an embodiment of the invention at present considered preferable by me.

In the drawings:

Fig. 1 is a perspective view of the portable apparatus of my invention for generating vapor having insecticidal properties and projecting said vapor into an enclosed space to be treated.

Fig. 2 is a plan view of the apparatus drawn on a larger scale. In this view the top plate of the carrying case enclosing the mechanism has been removed.

Fig. 3 is a cross section on line 3—3 of Fig. 1, on a larger scale.

Fig. 4 is a longitudinal section on line 4—4 of Fig. 1, on a larger scale.

Fig. 5 is a fragmentary sectional detail taken on line 5—5 of Fig. 2.

Fig. 6 is a cross section on line 6—6 of Fig. 1, on a larger scale.

Fig. 7 is a fragmentary elevation, on a larger scale than Fig. 3, showing the thermostatically operated switches of the latter view.

Fig. 8 is a wiring diagram showing how the different mechanisms are electrically connected.

Referring in detail to the drawings, the numeral 9 indicates a carrying case in which the mechanism of the insecticide diffuser is mounted. The case is provided on its top with a cover 10 carrying a handle 11. The cover may be removed from the case by taking off the control knob 42a and taking out screws 11a securing the cover to the case. A covering cap 11b for a filler opening 11c in the cover, and the dial 11d of a timer are also mounted on the cover of the case, said case being flat bottomed so that it will stand upright upon any convenient surface such as the floor or a table.

The case 9 is provided with a thermal chamber 12, insecticide feeding means, generally indicated at 13, serving to introduce the insecticide into the thermal chamber, a blower 14, effective to expel the vaporized insecticide from the thermal chamber, and timing mechanism, generally indicated at 15, by which the duration of operation of the apparatus is controlled. The mechanisms generally referred to will now be described more specifically, together with the electrical means by which they are operated.

The apparatus may be plugged into the usual house circuit by electric cord 16 which is connected within the case 9 to a terminal panel 17 mounted on one of two bracing members 18 extending between the upper end of a vertical partition 19 and the backwardly bent base portion 19a of the partition, thus providing support for mechanism comprised in the device.

The thermal chamber 12 overlies a hot plate 20 heated by a resistance element 21. The walls 22 of said chamber are lagged with heat insulating material 23 in order to maintain the walls at a temperature high enough to prevent condensation of the insecticidal vapor thereon.

Opposed openings 24 and 25 are provided in the vertical walls of the thermal chamber, opening 24 being in registration with an opening 26 in partition 19 through which air is delivered into said thermal chamber by blower 14.

Blower 14 entrains air through an opening 27 in the wall of the case 9 and is operated by an electric motor 28. Opening 25 registers with an opening 29 in the wall of said case, the vapor produced in the thermal chamber being discharged through the latter openings into the room or other space to be treated.

A supply of insecticidal material in the form of a finely granulated powder is contained in hopper 30 of the feeding means. The hopper is mounted on partition 19 over thermal chamber, and is formed with a rectangular slot-like throat 31 (Figs. 2 and 4).

A material agitating and feeding wheel 32 is rotatably mounted in the hopper by a shaft 33 extending through the hopper wall. A portion of the rim of said wheel extends into said slot-like throat and fits closely therein. The periphery of the wheel is provided with spaced, cut out notches 34 each of which pick up to capacity the grains of the insecticide powder and carry them, as the wheel rotates, from the hopper into the throat and thereupon drop them into the upper flared end 35 of a delivery tube 36 which extends downwardly through the top of the thermal chamber and to a point at or slightly below the current of air from the blower 14 flowing through the thermal chamber 12. The grains of insecticide material drop from the lower end of the tube 36 onto the hot plate and are instantly vaporized by the heat thereof as explained later in the description of the operation of the device. The greater portion of the wheel 32 extends into the material in the hopper and is effective to agitate the material to break up any lumps that may be present.

The slot 31 in which the wheel rotates is formed in a block of material 37 (Fig. 5) held against the throat portion of the hopper by small bolts 38 which also hold the flared upper end 35 of tube 36 in position. The apertured portion of the block 37 is contoured to the curvature of the wheel 32 and the notches 34 are spaced sufficiently far apart so that only one groove at a time is over the delivery opening through said block 32. The wheel 32 serves to close the mouth of the hopper when idle.

Shaft 33 of the notched wheel is rotated by an electric motor 32*a* through suitable conventional gearing, the motor and gearing being mounted in a housing 39*a* secured to a wall of the hopper 30 and to the vertical partition 19.

The electrical circuit and control means operating the mechanisms described comprise the electrically driven timing device 15 mounted on an angle 15*a* secured to the vertical partition 19, said mechanisms operate a first switch 40 in the power circuit of the apparatus. The timing device includes a disc 41 mounted on a shaft 42 rotated at a constant speed by the timer. The disc normally bears against the arm 40*a* (Fig. 2) of the switch 40 and keeps the switch closed but allows the switch to open when a notch 43 in the disc comes into register with the angled end of the arm of the switch. An adjusting knob 42*a* is mounted on the shaft 42 and the setting of the knob determines the length of time elapsing between the commencement of operation of the machine and termination of the vapor generating operation by the opening of switch 40. A second switch 44 (Fig. 2) is provided to enable the blower to continue in operation for a short time after termination of a vapor generation, arm 45 of the switch 44 also being opened a little after switch 40 by movement of the angled end of the arm 45 into recess 43.

The electrical circuit and automatically operating control means therefor in addition to the timing device and switches operated thereby as above described, comprises the terminal panel 17 to which the electric cord 16 is secured and from which leads extend to the various mechanisms described under the control of a first thermostatic switch 46 (Fig. 7), a second thermostatic switch 47, both mounted on the side of the thermal chamber, and a relay 48 mounted on the vertical partition 19. The relay armature is indicated at 48*a* and the back contact 48*b*.

The arrangement of the parts referred to and the circuits in which they are positioned is shown in Fig. 8.

After the electric cord 16 has been connected to a suitable source of electrical supply, the device may be turned on by turning the timer knob 42*a*. The turning of knob 42*a* acts to close the contacts of micro switches 40 and 44 by rotating disc 41 and depressing arms 40*a* and 45. Electrical current is supplied to a heating resistance 21 of thermal chamber 12 through the closed contacts of switches 40 and 44 and through the normally closed contacts of thermostatic switch 47.

Current is also supplied through the closed contacts of switch 44 and through the normally closed contacts of thermostatic switch 46 to the winding of a relay 48 and back through the closed contacts of switch 40 to the other side of the line. This energizes relay 48 to hold to armature 48*a* away from its contact 48*b*.

When the temperature is sufficiently high, thermostatic switch 46 opens, breaking the circuit through the winding of relay 48 and permitting armature 48*a* to engage contact 48*b*. This completes a circuit from one side of the line through the closed contacts of switch 44, through contact 48*b* and through the motor 15*b* of the timing device 15. Parallel circuits are simultaneously established through the motor 28 of blower 14 and through the motor 32*a* of feeding mechanism 13.

The feeding of the insecticide and the operation of the blower thus commence simultaneously with the starting of the timing mechanism. If the temperature in the thermal chamber becomes excessive during operation, thermostatic switch 47 acts to open its contacts, opening the circuit through heating resistance 21 without affecting the operation of the feeder and blower.

The device therefore continues to operate during the predetermined period controlled by the setting of the timing means 15, the second thermally operated switch 47 in the heating circuit being set to maintain the temperature of the thermal chamber 12 at the predetermined temperature by breaking said circuit whenever said temperature is exceeded and again completing the circuit when the temperature falls below the value desired. At the expiration of the time of operation the notch 43 in the timer dial will effect opening first micro switch 40 thus cutting out the resistance element 21 and feed mechanism, but leaving the blower 14 in circuit for a short time to clear vapor from the machine, until micro switch 44 is opened thereby breaking the circuit for both the blower and the timer.

The apparatus is placed at any suitable point in the room to be treated and the cable or cord is plugged into an electric outlet in the room. The timer knob 42*a* is then turned to the time required for the operation, which will depend upon the cubic area of the space to be treated, the type of insect to be exterminated and the amount of residue or dust desired to settle upon the surfaces in the room. Turning said knob also switches on the electric current after which the machine will operate automatically for the predetermined time and will then be switched off.

The sequence of operation of the mechanisms is that first the resistance heating coil 21 will be energized and the thermal chamber will become heated to the degree determined by the setting of the thermally operated switch 46 which will be operated when the predetermined temperature is reached to close the operating circuit through the motors of the feeding means and the blower. Maintenance of the temperature of the thermal chamber is thereafter effected by the thermostatic switch 47.

The temperature of the hot plate 20 is such as to instantly vaporize the succession of small charges of lindane dropped upon it by the feed wheel 32, while the temperature of the interior and surfaces of the chamber is kept high enough to prevent condensation of the lindane vapor thereon. The temperature of the hot plate is therefore maintained at about 650 to 800 degrees Fahrenheit which is sufficient to obtain the effect required. The lindane powder is delivered into the thermal chamber at a rate of about 1 ounce per 5 minutes for each 5000 cubic feet to be treated. At the termination of the period for which the timer has been set, the apparatus will be automatically switched off by the timer.

It is to be noted that the flow of air through the thermal chamber is arranged so that efficient vaporization of the lindane is secured. To obtain the required result the volume of air delivered by the blower 14 and the path of the stream of air over the hot bottom surface of the thermal chamber are such that the main current of air flows above the grains of lindane deposited on the heated bottom of the chamber so that solid grains of lindane are not blown out. Turbulence of air is set up however, due to the increase in diameter of the stream of air issuing from the blower from the inlet port into the larger area of the thermal chamber, which causes the outer portion of the air stream to impinge against the wall around the outlet port, causing air to flow over the heated grains of lindane in sufficient quantity to rapidly carry away the generated vapor and mix it with the main stream, thus the conditions for obtaining maximum rate of vaporization of the lindane are realized.

While the arrangement of the thermal chamber shown in the drawings is sufficient for illustrative purposes, it may be mentioned that in actual practice very satisfactory results have been secured by the use of a blower supplying a stream of 50 cubic feet of air per minute into the thermal chamber through an inlet port 1⅜ inches in diameter, the lower edge of which is spaced above the bottom of the chamber, and an outlet port of about 2 inches in diameter spaced close to the top of the wall of the thermal chamber opposite to the inlet port.

While I have particularly described and illustrated an embodiment of the invention at present considered preferable by me, it is to be understood that various modifications may be made therein without departing from the scope of the invention as defined in the subject matter claimed.

I claim:

1. Apparatus for producing and projecting insecticidal vapor into an enclosed space, comprising: a thermal chamber; electrical means effective to heat an area of said chamber to a temperature sufficient to instantly vaporize granular insecticidal material; heat insulation means maintaining the interior surface of the side walls of said chamber at a sufficient temperature to prevent deposit of insecticidal material thereon from the vapor formed in said chamber; a hopper for holding a supply of granular insecticidal material mounted above said thermal chamber; means for delivering a continuous succession of small charges of granular material from said hopper into said thermal chamber to impinge upon the area of said chamber instantly vaporizing the material; an electric motor for operating said material delivering means; a blower adapted to maintain a stream of air flowing through said chamber and out of the chamber into the enclosed space; an electric motor operating said blower; a timing device controlling the duration of operation of the apparatus; switch means operated by the timing device and effective when the timing device is initially set to switch on said electrical means for heating said chamber; thermostatically operated means actuated when the thermal chamber has reached a predetermined temperature to close a circuit through the motors of the material delivering means and blower; and a second thermostatically operated means in the circuit of the electrical heating means effective to maintain the thermal chamber at the predetermined temperature, said timing means being effective when the predetermined period of operation has elapsed, to open said switch means and stop operation of the apparatus.

2. Apparatus as set forth in claim 1 and in which said switch means operated by the timing device comprises a first switch controlling the circuit of the electrical heating means of the thermal chamber and of the motor driving the material delivering means, and a second switch controlling the circuit through the motor of the blower, both of said switches being closed by the initial setting of the timing means but on the termination of the period of operation of the apparatus the timing device first operating the first switch and later after a short interval of time operating the second switch to stop the motor of the blower.

3. In an apparatus of the kind described, a thermal chamber having a bottom portion comprising a heat radiating plate affording an upwardly directed heat radiating surface within said chamber, side walls forming parts of said chamber having a pair of aligned openings, said openings being disposed in and through a pair of oppositely disposed walls comprising said side walls, the lower edges of said openings being upwardly spaced in relation to said heat radiating surface, insulation adjacent to said chamber side walls and on the exterior surfaces thereof to help maintain said walls at a sufficiently high temperature level to prevent accumulation of condensed insecticide material thereon, air injection means operatively connected with certain of said openings to direct a current of air into said chamber superjacent to said surface and out another of said openings, and means to continuously deliver a succession of particles of volatile granular material upon said heat radiating surface to effect volatilization thereof, the latter means comprising a downwardly directed tube having an open lower delivery end located away from the direct path of the aforesaid stream of air.

4. In an apparatus of the kind described, a thermal chamber having a bottom portion comprising a heat radiating plate affording an upwardly directed heat radiating surface within said chamber, said chamber having openings through the walls thereof, the lower edges of said openings being upwardly spaced in relation to said heat radiating surface, air injection means operatively connected with certain of said openings to direct a current of air into said chamber superjacent to said surface and out another of said openings, means to continuously deliver a succession of particles of granular material upon said heat radiating surface, the latter means comprising a downwardly directed tube having an open lower delivery end located away from the direct path of the aforesaid stream of air, thermostatically operated means simultaneously to automatically start into operation said granular delivery means and said air injection means when said surface reaches a predetermined temperature, and switch means to automatically stop the operation of said granular delivery means shortly before the stopping of the operation of said air injection means.

5. A method of vaporizing lindane to destroy insect life in enclosed spaces such as the rooms of a dwelling which comprises the steps of first heating an interior surface area of a chamber to a temperature in excess of 650 degrees F., maintaining said area at said temperature, continuously delivering lindane powder in a stream of particles onto the heated area and maintaining a current of air flowing through said chamber above the particles while maintaining turbulence of the air in said chamber to effect flow of air over the particles to prevent burning and increase the rate of vaporization of the lindane and to mingle the vapor laden air with the main stream for ejection from the chamber into said enclosed spaces or rooms.

6. In an apparatus of the kind described, a thermal chamber having a bottom portion comprising a heat radiating plate affording an upwardly directed heat radiating surface within said chamber, said chamber having openings through the walls thereof, the lower edges of said openings being upwardly spaced in relation to said heat radiating surface, air injection means operatively connected with certain of said openings to direct a current of air into said chamber superjacent to said surface and out another of the openings, a hopper adapted to hold a supply of granular insecticidal material and mounted above the thermal chamber, a throat receiving material from the hopper, a notched wheel mounted in said throat and projecting into the material in said hopper, the notched wheel being effective while stationary to close said throat, an electric motor adapted to rotate said notched wheel, the notched wheel being effective when rotated to stir the material adjacent the throat and to release a constant succession of small charges of material from the hopper onto the heat radiating plate, thermostatic means operated by the heat of said thermal chamber upon reaching a predetermined value to simultaneously start into operation the air injection means and the motor driving said notched wheel, and a timing device and switch means operated thereby effective to start heating of the thermal chamber and after a predetermined period to stop the motor driving the notched wheel and the heating of the heat radiating plate and after a predetermined delay period to stop operation of the air injection means.

7. A method of vaporizing insecticide to destroy insect life in enclosed spaces such as the rooms of a dwelling which comprises the steps of first heating an interior surface area of a chamber to temperature in excess of 650° F. maintaining said area at said temperature, continuously delivering insecticide in a stream of particles onto the heated area and maintaining a current of air flowing through said chamber above the particles while maintaining turbulence of the air in said chamber to effect a flow of air over the particles to prevent burning and increase the rate of vaporization of the insecticide and to mingle the vapor laden air with the main stream for ejection from the chamber into said enclosed spaces or rooms.

8. In an apparatus of the kind described, a thermal chamber having a bottom portion comprising a heat radiating plate affording an upwardly directed heat radiating surface within said chamber, said chamber having openings through the walls thereof, the lower edges of said openings being upwardly spaced in relation to said heat radiating surface, air injection means operatively connected with said openings to direct a current of air into said chamber through one of said openings circumjacent to said surface and out another of said openings, means to continuously deliver insecticidal material upon said heat radiating surface, said means comprising a downwardly directed tube having an open lower delivery end located away from the direct path of the said stream of air, and thermostatically operated means simultaneously to automatically start into operation said insecticidal delivery means and said air injection means when said surface reaches a predetermined temperature.

9. The structure set forth in claim 8 and an electric circuit in which said delivery means and air injection means are included, said electrical circuit including a manually settable timing mechanism for regulating the length of time the apparatus is to operate.

10. The structure defined in claim 9, said electric circuit including switching means to automatically stop the operation of said delivery means shortly before stopping the operation of said air injection means.

11. In an apparatus of the kind described, a thermal chamber having a bottom portion comprising a heat radiating plate affording an upwardly directed heat radiating surface within said chamber, said chamber having openings through the walls thereof, the lower edges of said openings being upwardly spaced in relation to said heat radiating surface, air injection means operatively connected with said openings to direct a current of air into said chamber through one of said openings circumjacent to said surface and out another of said openings, means to continuously deliver insecticidal material upon said heat radiating surface said means comprising a downwardly directed tube having an open lower delivery end located away from the direct path of the said stream of air, and an electric circuit in which said delivery means and air injection means are included, said electric circuit including a manually settable timing mechanism for regulating the length of time the apparatus is to operate.

12. In an apparatus of the kind described, a thermal chamber having a bottom portion comprising a heat radiating plate affording an upwardly directed heat radiating surface within said chamber, side walls forming parts of said chamber and having a pair of aligned openings in opposite walls, the lower edges of said openings being upwardly spaced in relation to said heat radiating surface, insulation adjacent to said chamber side walls and on the exterior surface thereof to help maintain said walls at a sufficiently high temperature level to prevent accumulation thereon, air injection means operatively connected with certain of said openings to direct a current of air into said chamber superjacent to said surface and out another of said openings, means to continuously deliver a succession of particles of granular material upon said heat radiating surface, the latter means comprising a downwardly directed tube having an open lower delivery end located away from the direct path of the aforesaid stream of air, an electric circuit in which said granular delivery means and air injection means is included, thermostatically operated means included in said circuit to start the operation of said granular delivery means and said air injection means when said heat radiating plate reaches a predetermined temperature, switching means included in said circuit to automatically stop the operation of said granular delivery means shortly before the stopping of the operation of said air injection means, and manually settable timing mechanism included in said circuit for regulating the length of time the apparatus is to operate.

13. In an apparatus of the kind described, a thermal chamber having a bottom portion comprising a heat radiating plate affording an upwardly directed heat radiating surface within said chamber, side walls forming parts of said chamber and having a pair of aligned openings in opposite walls, the lower edges of said openings being upwardly spaced in relation to said heat radiating surface, insulation adjacent to said chamber side walls and on the exterior surface thereof to help maintain said walls at a sufficiently high temperature level to prevent accumulation thereon, air injection means operatively connected with one of said openings to direct a current of air into said chamber superjacent to said surface and out another of said openings, and means to continuously deliver insecticidal material upon said heat radiating surface, said means comprising a downwardly directed tube having an open lower delivery end located away from the direct path of the aforesaid stream of air.

References Cited in the file of this patent

UNITED STATES PATENTS

| | | |
|---|---|---|
| 1,811,191 | Taylor | June 23, 1931 |
| 1,930,588 | Dibble | Oct. 17, 1933 |
| 2,068,177 | Henion | Jan. 19, 1937 |
| 2,308,138 | Williams | Jan. 12, 1943 |
| 2,440,082 | Flanders et al. | Apr. 20, 1948 |
| 2,540,095 | Buehler | Feb. 6, 1951 |
| 2,541,637 | Christopher et al. | Feb. 13, 1951 |
| 2,606,096 | Berkner | Aug. 5, 1952 |
| 2,619,256 | Wiley | Nov. 25, 1952 |
| 2,660,828 | Abrams | Dec. 1, 1953 |
| 2,662,332 | McIntire | Dec. 15, 1953 |

FOREIGN PATENTS

| | | |
|---|---|---|
| 293,367 | Great Britain | June 28, 1928 |